United States Patent [19]
MacLeod

[11] Patent Number: 5,352,947
[45] Date of Patent: Oct. 4, 1994

[54] SPINDLE MOTOR ASSEMBLY FOR DISC DRIVES

[75] Inventor: Donald J. MacLeod, Santa Cruz, Calif.

[73] Assignee: Seagate Technology, Inc., Scotts Valley, Calif.

[21] Appl. No.: 745,983

[22] Filed: Aug. 6, 1991

Related U.S. Application Data

[63] Continuation of Ser. No. 424,673, Oct. 27, 1989, abandoned.

[51] Int. Cl.⁵ .................. H02K 21/12; H02K 7/14; G11B 17/08; G11B 17/02
[52] U.S. Cl. .................. 310/67 R; 310/156; 360/98.07; 360/99.08
[58] Field of Search ............. 310/67 R, 68 B, 156, 310/90; 360/98.07, 99.04, 99.08; 369/266, 270

[56] References Cited

U.S. PATENT DOCUMENTS

| | | | |
|---|---|---|---|
| 4,285,016 | 8/1981 | Gilovich | 360/84 |
| 4,417,186 | 11/1983 | Hirose et al. | 310/156 |
| 4,488,076 | 12/1984 | MaCleod | 310/67 R |
| 4,494,028 | 1/1985 | Brown | 310/156 |
| 4,633,110 | 12/1986 | Genco et al. | 310/71 |
| 4,656,545 | 4/1987 | Kakuta | 360/98.07 |
| 4,686,592 | 8/1987 | Carroll et al. | 360/97 |
| 4,734,606 | 3/1988 | Hajec | 310/67 R |
| 4,755,699 | 7/1988 | Schmider | 310/156 |
| 4,760,298 | 7/1988 | Kitahara et al. | 310/67 R |
| 4,763,053 | 8/1988 | Rabe | 318/254 |
| 4,775,906 | 10/1988 | Suzuki et al. | 360/98 |
| 4,797,762 | 1/1989 | Levy et al. | 360/99.06 |
| 4,827,168 | 5/1989 | Nakajima | 310/90 |
| 4,905,110 | 2/1990 | Krum et al. | 360/99.08 |
| 4,943,748 | 8/1990 | Shizawa | 310/67 R |
| 4,949,000 | 8/1990 | Petersen | 310/179 |
| 4,965,476 | 10/1990 | Lin | 310/51 |

FOREIGN PATENT DOCUMENTS

| | | |
|---|---|---|
| 0220447 | 9/1986 | European Pat. Off. . |
| 3542542 | 6/1987 | Fed. Rep. of Germany . |
| 0173770 | 9/1985 | Japan . |
| 0154460 | 7/1986 | Japan . |
| 61-154460 | 7/1986 | Japan . |
| 8401863 | 5/1984 | PCT Int'l Appl. . |
| 8807285 | 9/1988 | PCT Int'l Appl. . |
| 2173049 | 10/1986 | United Kingdom . |

*Primary Examiner*—Steven L. Stephan
*Assistant Examiner*—C. LaBalle
*Attorney, Agent, or Firm*—Flehr, Hohbach, Test, Albritton & Herbert

[57] ABSTRACT

A novel spindle motor assembly is disclosed that utilizes a fixed shaft and places the motor rotor components on the outside wall of the spindle hub directly below its disc stack supporting flange. The structure disclosed provides a compact yet powerful motor having a relatively low profile.

33 Claims, 4 Drawing Sheets

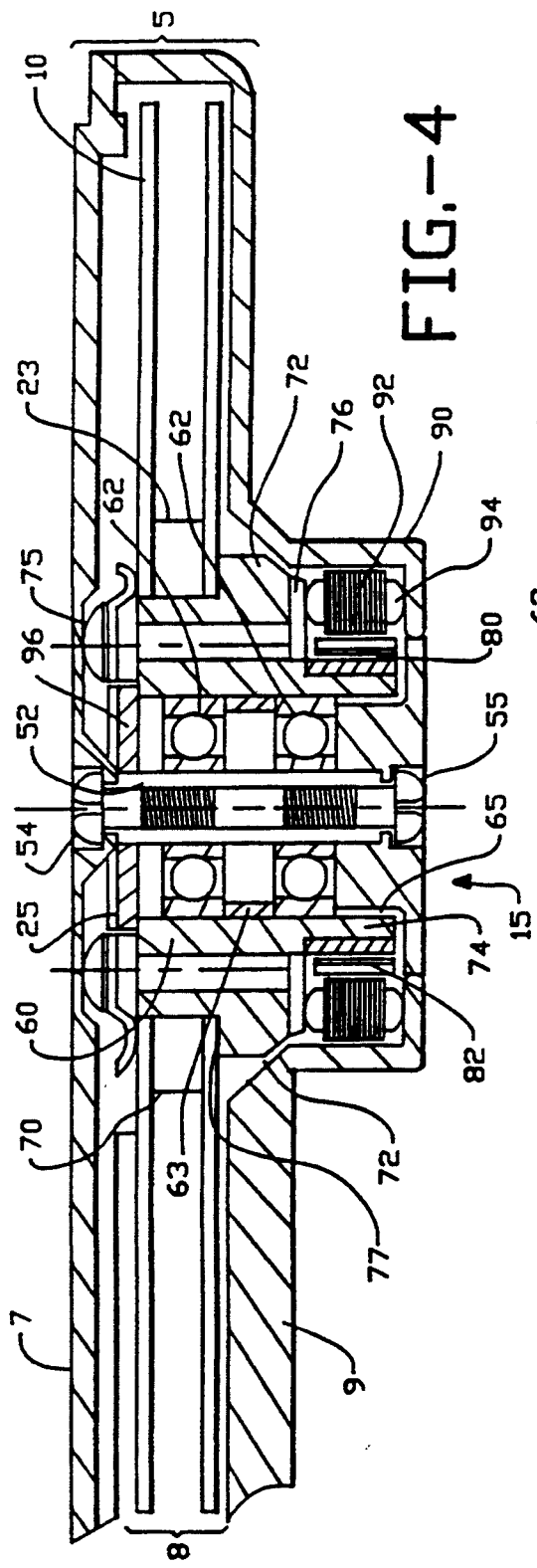
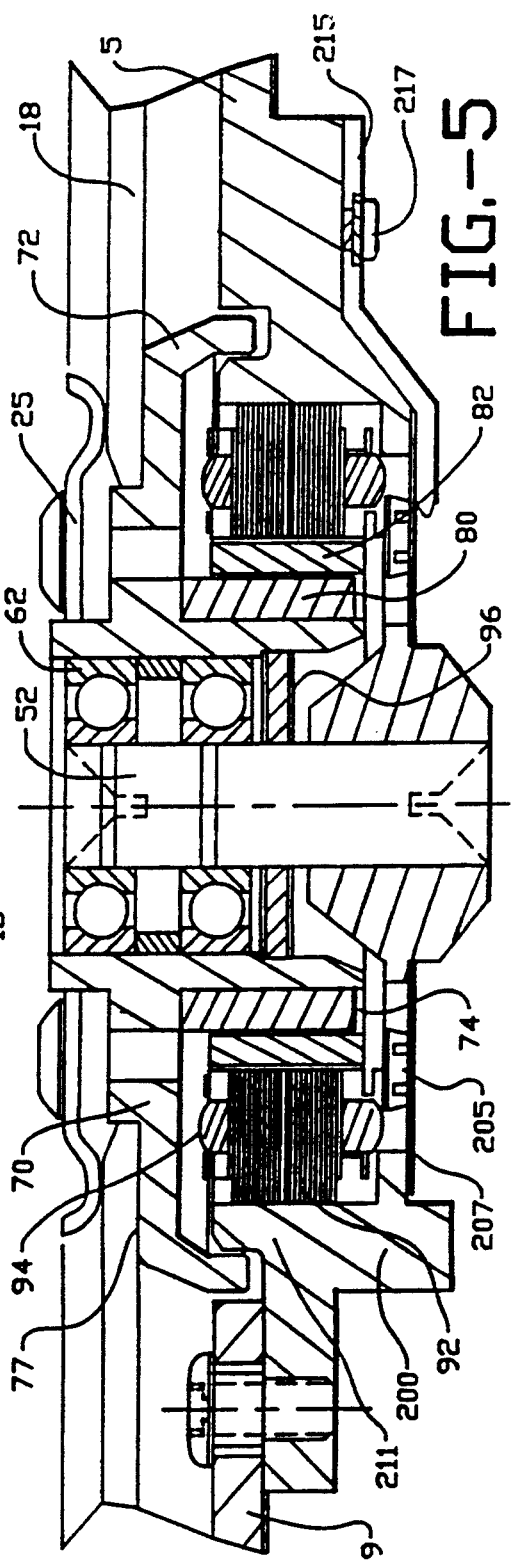

SPINDLE MOTOR ASSEMBLY FOR DISC DRIVES

This is a continuation of application Ser. No. 07/424,673, filed on Oct. 27, 1989, now abandoned.

The present invention relates generally to disc drives. More particularly, an improved spindle motor assembly is described.

BACKGROUND OF THE INVENTION

Disc drives for modern desktop computer systems record and reproduce information on a recording medium. The medium generally takes the form of a stack of circular information storage discs having a multiplicity of concentric tracks. Conventional Winchester type disc drives include a disc stack having one or more vertically aligned information storage discs which are journaled about the hub portion of a single spindle assembly. Each disc has at least one associated magnetic head that is adapted to transfer information between the disc and an external system. The heads are typically arranged to move back and forth radially across the disc and a spindle motor assembly is provided to rotate the discs. The movements of the spindle and the magnetic heads cooperate to allow random access to any portion of the disc.

Although disc drives are a relatively old and established technology, consumer demands continuously push for more compact, higher capacity, faster accessing designs. One of the size limiting components in traditional designs has been the spindle motor assembly used to rotate the information storage discs.

A conventional spindle motor assembly used in disc drive applications is shown in FIG. 1. As seen therein, traditional spindle motor assemblies typically include a non-rotating spindle flange 100 that is securely fastenable to the drive housing. A rotatable spindle hub 106 is journaled about spindle flange 100, and is carried by an elongated rotatable shaft 112 that extends co-axially with the hub and flange. A pair of spaced apart ball bearings 115 are coupled between the shaft and flange to allow the spindle shaft 112 to rotate freely within the confines of spindle flange 100. A motor 118 is disposed directly underneath the spindle arrangement such that the motor components are located outside of the disc housing when the drive is assembled. The motor 118 includes a stator assembly 121 and a rotor assembly 124. The stator assembly includes a plurality of lamination stacks each having a winding wrapped thereabout. The rotor assembly 124 is attached to the spindle shaft by a lower hub 127. It includes a cup shaped rotor cap 130, a raised annular flange portion 132 with a plurality of magnets 133 disposed about the interior surface of the flange. Such an arrangement does not readily lend itself to miniaturization when used in conventional disc drives, since it has numerous components having large airspaces therein. Further, mere reduction in component size tends to weaken the component's structure, which tends to lead to faster wear and to lower the mechanical resonance frequencies of the motors. Such mechanical resonances generate acoustic noises which are irritating to users and therefore are preferably minimized.

One spindle motor design approach that has better space utilization than the traditional design incorporates an in-hub motor, as shown in FIG. 2. In this approach, a fixed shaft 150 is provided about which a spindle hub 152 is journaled. A pair of spaced-apart ball bearings 154, 155 are mounted directly between the fixed shaft and the rotatable hub 152. The rotor magnets 156 are carried directly by the spindle hub 152, and the stator windings 157 are disposed between the spaced apart ball bearings 154, 155. Although such a design is more compact than the traditional design described above, it suffers a drawback in that the bearings 154, 155 and the windings 157 compete for space within the hub region. This is not a particular problem in high profile disc drives, since there is ample room to provide sufficiently sized bearings and stator windings. However, in low profile disc drives, either the size (and strength) of the bearings or the size (and power) of the stator windings must suffer. Such a sacrifice is unacceptable for high quality, high performance disc drives.

Yet another recent approach is shown in FIG. 3. In this approach, a fixed shaft 170 is again used and the spindle hub 172 has a cup-shaped radial cross section. The bearings 174, 175 are placed between the shaft 170 and an inner wall 171 of the spindle hub 172. The hub has a large U-shaped trough 176 outside of the inner wall, and motor components are positioned within the enlarged trough 176. Specifically, the rotor magnets 178 are carried by an outer wall 179 of the spindle hub while the stator windings 181 are carried by a support ring 183 extending upward from the motor housing's base within the U-shaped trough. While such an arrangement allows adequately-sized bearings and stator windings, it requires a disc with a large inner diameter, since the hub must be quite large.

In view of the drawbacks of the prior art designs, there is a need for a compact spindle motor design that is capable of providing the performance required by state-of-the-art disc drives.

SUMMARY OF THE INVENTION

Accordingly, it is a primary objective of the present invention to provide a compact spindle motor assembly that is relatively significantly smaller and adaptable for use in a low-profile disc drive.

Another objective is to provide a high torque spindle motor assembly that is rugged, easy to manufacture, and has a small parts count.

To achieve the foregoing and other objectives, and in accordance with the purpose of the present invention, a novel spindle motor assembly is disclosed that utilizes a fixed shaft and places the motor components on the outside wall of the spindle hub directly below its flange. More specifically, the disclosed spindle motor assembly for disc drives includes a fixed shaft having a spindle hub journaled coaxially thereabout. The spindle hub has several distinct portions including an enlarged thickness flange portion which support the drive's disc stack, and a reduced thickness rotor carrying portion located adjacent the side of the flange opposite the disc stack. A pair of spaced apart bearings rotatably couple the spindle hub to the fixed shaft, with each of the bearings having its inner race secured to the fixed shaft and its outer race secured to the inner surface of the spindle hub. The rotor assembly includes a magnetic arrangement having a number of poles, and is carried by the outer surface of the rotor carrying portion of the spindle hub. The stator has a plurality of fixed windings that cooperate with the rotor to rotate the spindle hub (and thus the disc stack) with the shaft. The stator assembly is preferably substantially positioned within the space defined by the hub's flange and rotor carrying portions.

In a preferred embodiment, Hall effect sensors are set in a fixed place adjacent the rotor magnet to detect the passage of the poles to control commutation. To improve the Hall effect sensors' sensitivity, the magnet is magnetized to establish two nonparallel flux regions for each pole.

BRIEF DESCRIPTION OF THE DRAWINGS

The features of the present invention that are believed to be novel are set forth with particularity in the appended claims. The invention, together with further objects and advantages thereof, may best be understood by reference to the following description taken in conjunction with the accompanying drawings in which:

FIG. 4 is a cross sectional view of a spindle motor assembly designed in accordance with the present invention;

FIG. 5 is a cross sectional view of an alternative embodiment of the present invention that incorporates Hall effect sensors to control commutation;

DETAILED DESCRIPTION OF A PREFERRED EMBODIMENT

Figure 7:
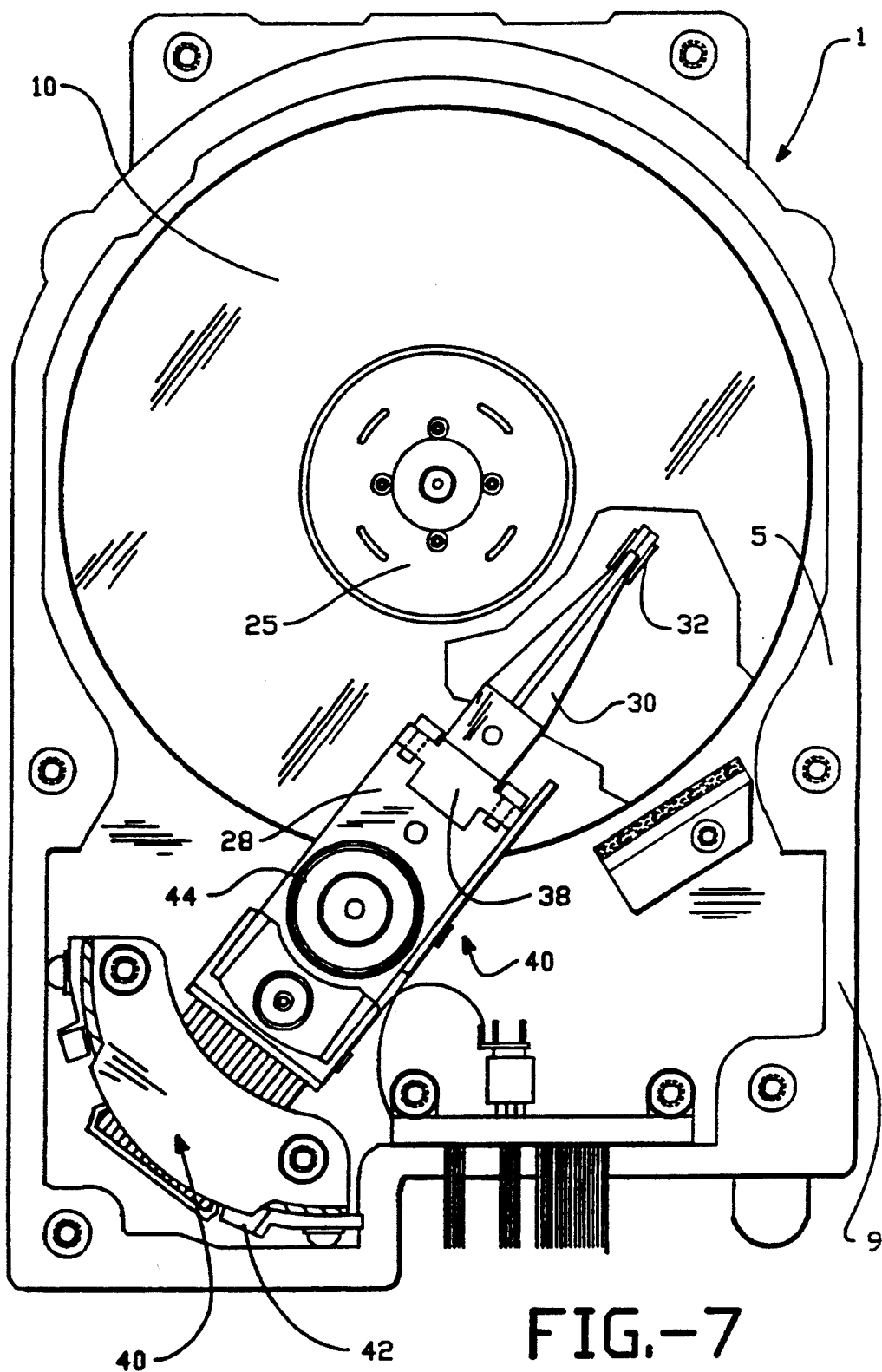
FIG. 7 is a diagrammatic top view of a disc drive with its top cover removed that is suitable for incorporating the spindle motor assembly of the present invention.

Referring initially to FIGS. 4 and 7, a rotary disc drive 1 suitable for incorporating the teachings of the present invention is shown in schematic and plan views. A disc stack 10 is journaled about a spindle motor assembly 15 within a housing 5 having upper and lower casing members 7 and 9, respectively. The disc stack 10 includes a plurality of information storage discs 10 with a spacer 23 disposed between adjacent discs 10 to maintain their spacing. In the embodiment shown in FIG. 4, only two information storage discs are used. However, it should be appreciated that any number of information storage discs may be incorporated into the disc stack with spacers between each adjacent pair of discs. A disc clamp 25 positioned above the top information storage disc firmly secures the disc stack to the hub portion of spindle motor assembly 15.

A head positioner assembly 28 is rotatably mounted between the upper and lower casings 7, 9 in one corner of the housing 5. The head positioner assembly 28 carries a plurality of head arm flexures 30 that each carry a magnetic read/write or servo heads 32 for reading information from and writing information onto the magnetic discs 10. The head arms are each attached to the head positioner assembly 28 by individual flexure mounts 38. A voice coil motor 40 is adapted to precisely rotate the head positioner assembly back and forth such that the data and servo heads move across the magnetic discs. A magnetic latch 42 holds the head positioner assembly in place when the disc drive is not in use.

Each magnetic disc 10 has a multiplicity of concentric circular information storage tracks for recording information. The rotative action of spindle motor assembly 15, when combined with the generally radial movements of heads 32 controlled by head positioner assembly 28, allows random access to information stored on the discs 10.

Referring next primarily to FIG. 4, the first embodiment of the spindle motor 15 chosen for the purpose of illustration includes a fixed spindle shaft 52 that is secured to the drive housing 5 by a pair of opposing screws 54 and 55. It should be appreciated that other spindle shaft mounting would work as well. By way of example, one end of the shaft could be press fit into a recess in either the upper or lower casing. A rotatable spindle hub 60 coaxially journaled about the spindle shaft 52 and is supported by a pair of spaced apart ball bearings 62. The inner and outer races of the ball bearings 62 are fixedly attached, preferably adhesively bonded, to the spindle shaft and the inner surface of the spindle hub 60, respectively, and allow the spindle hub 60 to rotate freely about the spindle shaft 52. The ball bearings 62 are separated by a spacer 63 which is used to axially preload the bearings during fabrication.

The spindle hub 60 has substantially cylindrical walls which define an inner bore 65 that receives the spindle shaft 52 and the ball bearings 62. The wall is divided into three separate sections, and has an annular post ring 67 for supporting the disc clamp 25. Specifically, the wall includes a relatively thick upper section 70, an enlarged middle flange section 72, and a relatively thin magnet supporting lower section 74. A multiplicity of screwholes extend downward from the top portion of the hub through the upper and flange sections of the wall to receive the clamp screws 75 that secure the disc clamp 25 to the spindle motor 15. A small coverplate 76 is journaled about the hub below the flange 72 to seal the screwholes to prevent dust particles and metal flakes within the motor assembly from escaping into the main disc chamber. The flange 72 provides a support surface 77 upon which the information storage discs 10 can rest. Thus, the disc stack is held in place between the disc clamp 25 and the support surface 77 of flange 72.

An iron magnet support ring 80 is fixedly attached, preferably adhesively bonded, to the lower hub section 74. In the described embodiment, the spindle hub 60 is formed of aluminum. A ring magnet 82 is fixedly attached to the magnet support ring 80 to firmly secure the magnet to the spindle hub. Since the magnet 82 is carried by the spindle hub 60, it will rotate with the spindle hub, and therefore forms the rotor portion of the spindle motor assembly.

As shown in FIG. 4, if an area is defined by the outer wall of the flange 70 which carries the disc stack 18, then the magnet 82 is completely within this area. On the other hand, the stator 92 is only partially within this area. Thus, the motor of the present invention extends horizontally beyond the area defined by the outer walls of the flange 70. In addition, the motor is also below the disc stacks.

In the embodiment of the spindle motor shown in FIG. 4, the disc stack 8 contains only two information storage discs, and the housing 5 is designed to minimize the drive's profile and space consumed. Accordingly, lower casing member 9 includes a cylindrical well recess 90 adapted to receive the stator and rotor portions of the spindle motor 15. A multiplicity of stator windings 92 are wound about ferric lamination stacks 94 which in turn are adhesively bonded to the inner walls of the well recess 90.

A conventional ferrofluidic seal 96 incorporating a fluid magnetic shield is positioned within the inner bore 65 of spindle hub 60 to provide a seal against contamination by air flow from the bearing area to the head disc area.

Referring next to FIG. 5, an alternative embodiment of the invention will be described using like numbers to denote like parts. In this embodiment, a Hall effect sensor arrangement is provided that monitors the rotations of the rotor to control commutation. FIG. 5 also shows slightly different embodiments of several other components of the spindle motor as well to exemplify a few of the modifications contemplated within the scope of the invention. In the second described embodiment, a single information storage disc 10 is contemplated, and thus the upper section 70 of the spindle hub is greatly reduced. Further, a base plate 200 is provided which is coupled to the disc housing 5 by a plurality of screws, and which allows the stator and Hall effect sensor arrangement to be installed as a separate unit.

Hall effect sensors 205 are mounted on a printed circuit board 207 that is carried by the base plate 200 and are positioned immediately below ring magnet 82. Thus, every time a pole passes a sensor, it detects the change of flux and so informs a controller (not shown) which is used to control commutation of the motor. Several Hall effect sensors may be situated about the base plate to detect incremental movements. By way of example, in the embodiment chosen for the purposes of illustration, three Hall effect sensors are used which are disposed at 120 degree angles with respect to one another.

Figure 1:
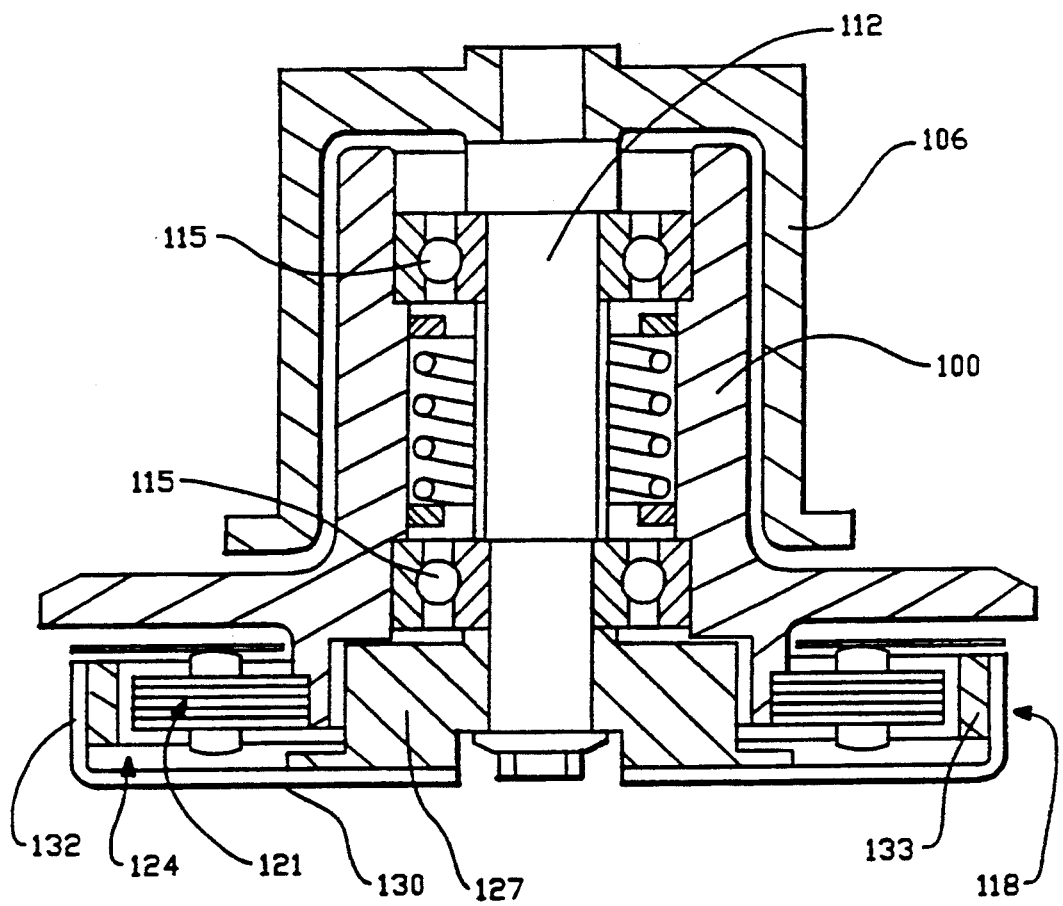
FIG. 1 is a diagrammatic cross sectional view of a traditional spindle motor assembly.
Figure 6:
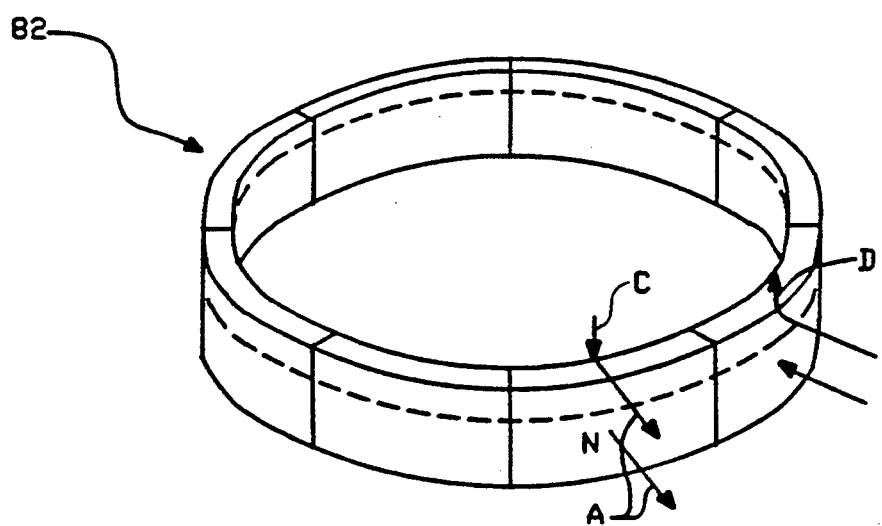
FIG. 6 is a diagrammatic perspective view of the magnet shown in FIG. 5 highlighting the flux orientations of the various poles.
Figure 2:
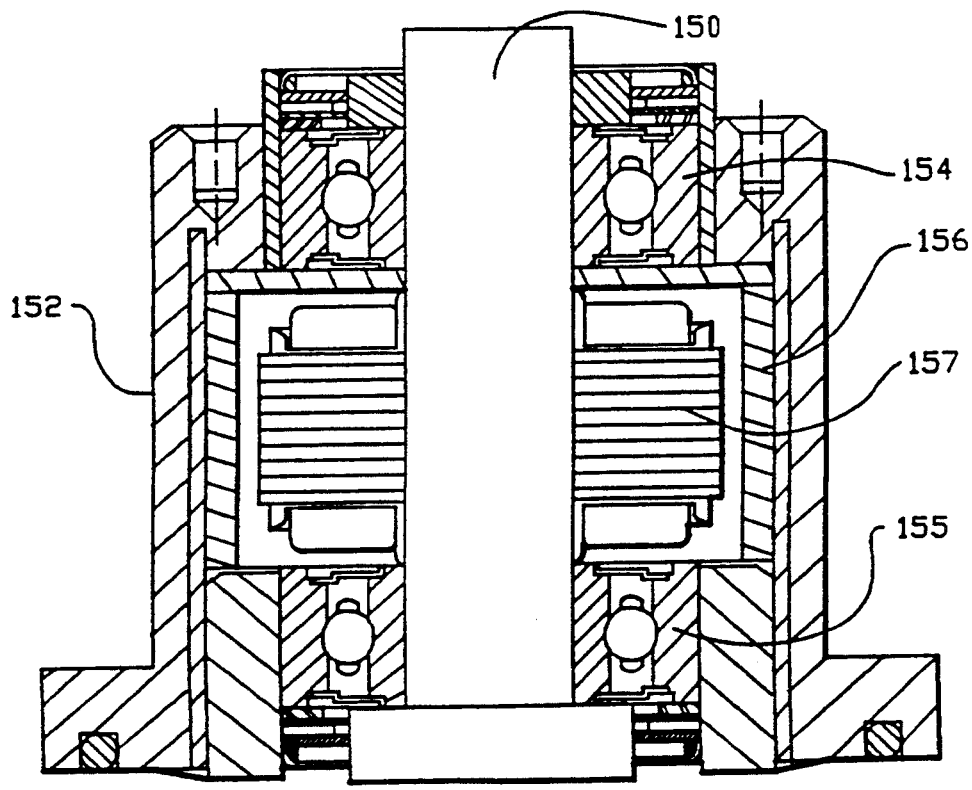
FIG. 2 is a diagrammatic cross sectional view of a prior art fixed shaft spindle motor assembly.
Figure 3:
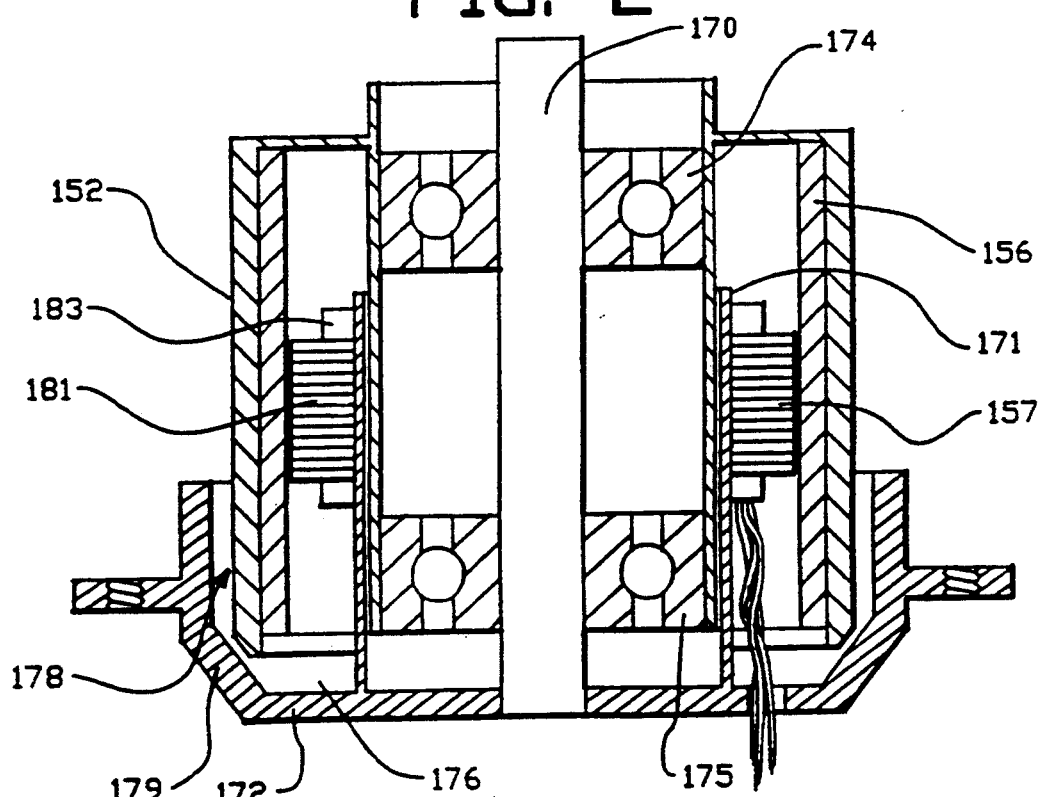
FIG. 3 is a diagrammatic cross sectional view of a second prior art fixed shaft spindle motor assembly.

As will be appreciated by those skilled in the art, the ring magnet 82 would typically be magnetized to provide the strongest field perpendicular to its outer surface (as suggested by flux lines A and B in FIG. 6). Although Hall effect sensors mounted as described would typically be able to detect enough of a flux change to note the passage of a pole, the magnetic rings may be magnetized such that each pole emits a field having two different orientations as seen in FIG. 6. Specifically, the lowest portion of the magnet immediately adjacent the Hall effect sensors magnetized such that its flux lines C and D are parallel to the magnet's outer surface as shown in FIG. 6, while the vast majority of the ring magnet 82 is magnetized in the traditional manner.

Returning to FIG. 5, the spindle flange in the described embodiment turns down to overlap a protruding ring 211 that extends upwardly from the base. The overlap serves to better isolate the spindle assembly to reduce the transfer of dust particles and metallic flakes between the airspace about the spindle motor components and the airspace within the main drive compartments. A printed circuit cable 215 extends from the printed circuit board 207 to the controller. The printed circuit cable is As shown in FIG. 5, if an area is defined by the outer wall of the enlarged thickness portion of the flange 70 which carries the disc stack 18, then the magnet 82 is completely within this area. On the other hand, the stator 92 is only partially within this area. Thus, the motor of the present invention extends horizontally beyond the area defined by the outer walls of the enlarged thickness flange portion 70. In addition, the motor is also below the disc stacks.

As will be appreciated by those skilled in the art, the actual number of poles in the rotor's ring magnet 82 and the number windings in the stator may be widely varied depending upon the retirements of the motor. By way of example, in the described embodiment, the ring magnet includes eight poles and the stator includes twelve windings 92.

It should also be apparent that the described spindle motor structure has several advantages over conventional designs. Initially, the described structure is inherently very stiff which tends to reduce the drive's susceptibility to the excitation of structural mechanical resonances which, in turn, often produce undesirable acoustic noise. The design has a low profile which saves space in the continuing quest to reduce the required overall drive size. It can also provide a high torque to a compact, light weight hub assembly which allows rapid information access. Finally, the resultant design has a lower parts count than traditional spindle motors which simplifies manufacturing and reduces the overall spindle motor cost.

Although only a few embodiments of the present invention have been described herein, it should be understood that the present invention may be embodied in many other specific forms without departing from the spirit or scope of the invention. Particularly, it should be appreciated that the actual size and geometry of the spindle hub, as well as the casing and/or base plate, may be widely varied. Similarly, it is contemplated that the size and strengths of the various spindle motor components should be designed to accommodate the specific requirements of a specific drive. Therefore, the present examples and embodiments are to be considered as illustrative and not restrictive, and the invention is not to be limited to the details given herein, but may be modified within the scope of the appended claims.

What is claimed is:

1. A spindle motor assembly comprising:
    a drive housing with a base;
    a fixed shaft;
    a spindle hub journaled coaxially for rotation about the fixed shaft, the spindle hub having inner and outer surfaces, a spindle flange having an enlarged thickness flange portion with a support surface for supporting a disc stack, and a reduced thickness rotor carrying portion located adjacent at least one of a pair of spaced apart bearings, the bearings rotatably coupling the spindle hub to the fixed shaft and having an inner race secured to the fixed shaft and an outer race secured to the inner surface of the spindle hub;
    magnet means carried by an outer surface of the rotor carrying portion of the spindle hub, the magnet means having a plurality of poles, and forming the rotor portion of the spindle motor;
    stator means having a plurality of fixed windings for cooperating with the magnet means to rotate the spindle hub with respect to the shaft;
    said stator means and said magnet means being horizontally oriented with respect to each other;
    an extended portion of said spindle flange extending beyond said enlarged thickness flange portion and down towards the base of said disc drive, and a ring portion of said base extending up from said base towards said flange, said ring and said extended flange overlapping to form a seal to isolate the spindle motor from the disc drive housing; and
    said magnet means are inside an area defined by an outer wall of said enlarged thickness flange portion and said stator means are partially within said area and both said stator means and said magnet means are below said disc stack.

2. A spindle motor assembly as recited in claim 1 further comprising a Hall effect sensor fixedly positioned adjacent the magnet means to detect passage of the poles to control commutation.

3. A spindle motor assembly as recited in claim 2 wherein said magnet means includes an annular ring formed of a magnet material, the annular ring being magnetized to have a multiplicity of poles and each pole is magnetized to generate fields having two separate orientations.

4. A spindle motor assembly as recited in claim 2 further comprising a base plate for mounting the spindle motor assembly to a disc drive housing, and wherein the base plate carries the stator means and the Hall effect sensor.

5. A spindle motor assembly as recited in claim 1 wherein said magnet means includes:
an annular ring formed of a magnet material, the annular ring being magnetized to have a multiplicity of poles; and
a ferric ring secured to the outer surface of the rotor carrying portion of the spindle hub for carrying the magnetic ring.

6. A spindle motor as claimed in claim 1 wherein said magnet means include a magnet support ring attached to said outer surface of said rotor carrying position, and a motor magnet fixedly attached to said magnet support ring, said magnet means thereby forming the rotor portion of said spindle motor.

7. A spindle motor assembly for rotating a disc within a disc drive housing comprising:
a drive housing with a base;
a fixed shaft having a base end fixedly coupled to the drive housing;
a pair of spaced apart bearings for rotatably coupling a spindle hub to the fixed shaft, each said bearing having an inner race secured to the fixed shaft and an outer race secured to an inner bore of the spindle hub;
said spindle hub being journaled coaxially about the fixed shaft, said spindle hub having a spindle flange with an enlarged thickness flange portion having an outer surface for supporting the disc, and said spindle hub having a magnet carrying portion located adjacent at least one of said bearings;
magnet means carried by an outer surface of the magnet carrying portion, the magnet means having a plurality of poles and forming a rotor portion of the spindle motor;
stator means having a plurality of fixed windings for cooperating with the magnet means to rotate the spindle hub with respect to the shaft, said stator means being located near said base end of said shaft outside of said bearings, said inner bore of said spindle hub, and said magnet means;
an extended portion of said spindle flange extending beyond said enlarged thickness flange portion and down towards the base of said disc drive, and a ring portion of said base extending up from said base towards said flange, said ring and said extended flange overlapping to form a seal to isolate the spindle motor from the disc drive housing; and
said magnet means are inside an area defined by an outer wall of said enlarged thickness flange portion and said stator means are partially within said area and both said stator means and said magnet means are below said disc.

8. A spindle motor as recited in claim 7 wherein said drive housing has a base forming a well into which the magnet means and stator means may be recessed.

9. A spindle motor assembly as recited in claim 8 further comprising a base plate for mounting the assembly to the drive housing and wherein the shaft and the stator means are carried by the base plate.

10. A spindle motor as claimed in claim 7 wherein said fixed shaft is fixed in place by a screw extending through said base and the base end of said shaft.

11. A compact spindle motor assembly for rotating a disc within a disc drive comprising:
a housing for said disc having upper and lower casings;
a fixed shaft for said motor having upper and lower ends, the lower end of said shaft being fixed to the lower surface of said housing;
a plurality of bearings;
a spindle hub journaled coaxially about said fixed shaft and supported for rotation thereabout,
said spindle hub having an inner bore rotating on said bearings, said bearings located between said fixed shaft and said inner bore, and magnet means located horizontally adjacent said bearings and supported on an external surface of a lower portion of said inner bore,
said spindle hub also supporting said disc on a flange extending out from said inner bore above said magnet means and over a region where stator coils of said motor are located,
said stator coils being supported from said lower casing of said motor adjacent said magnet means,
said magnet means are inside an area defined by an outer wall of said flange portion and said stator means are partially within said area and both said stator means and said magnet means are below said disc.

12. A compact spindle motor as claimed in claim 11 wherein said lower casing includes a cylindrical well extending below a plane defined by a bottom surface of said lower casing for said motor, said well having downwardly extending sides and a bottom surface, said stator coils being located adjacent the sides and bottom of said well.

13. A compact spindle motor as claimed in claim 12 wherein said lower portion of said spindle bore supporting said magnet means is relatively thin compared to the remainder of said spindle hub so that the region of said hub supporting said magnet means and said magnet means occupy minimal space within said well.

14. A compact spindle motor as claimed in claim 12 wherein said spindle hub extends entirely over the region where said stator coils are located.

15. A compact spindle motor as claimed in claim 14 wherein said flange includes screw holes extending down through an upper portion of said bore for receiving screws to hold a disc fastener atop said disc, and further including a shield at the bottom of said screw holes on a bottom surface of said a flange facing said stator coils and magnet means to prevent particles from entering a motor region defined by said stator coils and magnet means through said screw holes.

16. A compact spindle motor as claimed in claim 14 wherein said magnet means comprise a magnet support ring attached to said inner bore and a ring magnet attached to said support ring whereby the magnet rotates with the spindle hub and forms the rotor portion of the assembly.

17. A compact spindle motor as claimed in claim 12 wherein said spindle hub extends beyond said downwardly extending sides of said well.

18. A compact spindle motor as claimed in claim 17 wherein said spindle hub extends down toward said lower casing of said disc drive and into a recess in said lower casing beyond said side of said well.

19. A compact spindle motor as claimed in claim 18 wherein said lower casing includes a base plate attached to said portion of said casing defining the bottom of said disc drive housing by screws outside said motor well, said base plate carrying the stator coils and position sensors for said motor to be located adjacent said rotating magnet means whereby said stator and said position sensors may be easily installed in said motor in said disc drive.

20. A compact spindle motor as claimed in claim 12 wherein said stator coils are confined within said well and do not extend above the downwardly extending walls of said well, said spindle hub extending over said stator coils to be closely adjacent said lower casing of said disc drive and defining a confined region for said stator coils and said magnet means.

21. A compact spindle motor as claimed in claim 20 wherein said motor includes a first screw inserted through said upper casing into one end of said shaft and a second screw inserted through said lower casing into the lower end of said shaft to fix said shaft and said spindle motor firmly in place in said housing.

22. A spindle motor for a disc drive, comprising a fixed shaft (52), a drive housing with a base, a spindle hub (606) journaled co-axially for rotation about the fixed shaft, the spindle hub having a spindle flange with an enlarged thickness flange portion (72) for supporting at least one disc, a pair of spaced apart bearings (62) for rotatably coupling the spindle hub to the fixed shaft, each said bearing having an inner race secured to the fixed shaft and an outer race secured to an inner surface of the spindle hub, magnet means (82) carried by the spindle hub, the magnet means having a plurality of poles and forming a rotor portion of the spindle motor, and stator means (92, 94) having a plurality of fixed windings for cooperating with the magnet means to rotate the spindle hub with respect to the shaft, characterized in that the magnet means are carried by an outer surface of the spindle hub and are located adjacent at least one of the pair of spaced apart bearings, said magnet means and said stator means being horizontally oriented with respect to each other, and an extended portion of said spindle flange extending beyond said enlarged thickness flange portion and down towards the base of said disc drive, and a ring portion of said base extending up from said base towards said flange, said ring and said extended flange overlapping to form a seal to isolate the spindle motor from the disc drive housing, and said magnet means are inside an area defined by an outer wall of said enlarged thickness flange portion and said stator means are partially within said area and both said stator means and said magnet means are below said disc.

23. A spindle motor assembly according to claim 22 characterized by a Hall effect sensor (205) fixedly positioned adjacent the magnet means to detect passage of the poles to control commutation.

24. A spindle motor assembly according to claim 22 characterized in that the magnet means comprises an annular ring which is magnetized to have a plurality of poles, and in that each pole is magnetized to generate fields having two separate orientations.

25. A spindle motor assembly according to claim 22 characterized in that the stator means is located near and supported from a base end of the fixed shaft outside the bearings.

26. A disc drive including a spindle motor assembly according to claim 25 characterized in that the disc drive has a housing (5) comprising an upper casing (7) and a lower casing (9), the lower casing forming a well (90), into which the magnet means and the stator means are recessed.

27. A disc drive according to claim 26 characterized in that the lower casing carries the stator means.

28. A disc drive according to claim 27 characterized in that the spindle motor assembly includes a base plate (200), which is secured to the fixed shaft and which carries the stator means, the base plate being secured to form part of the lower casing.

29. A disc drive comprising a housing (5) for at least one disc, and a spindle motor assembly for rotating at least one said disc, the spindle motor assembly comprising a shaft (52) fixed to the disc drive housing, a spindle hub (60) journaled coaxially about the fixed shaft on a plurality of bearings and supported for rotation thereabout, the spindle hub supporting at least one said disc on a flange, magnet means (82) supported on the spindle hub and disposed horizontally adjacent said bearings, and stator coils (92, 94) supported adjacent the magnet means, characterized in that the magnet means are located on an external surface of a lower portion of the spindle hub, the stator coils are supported by a lower casing of the disc drive housing, and a portion of the spindle hub supporting at least one said disc extends over the stator coils, and said magnet means are inside an area defined by an outer wall of said flange portion and said stator means are partially within said area and both said stator means and said magnet means are below said disc.

30. A disc drive according to claim 29 characterized in that the lower casing includes a cylindrical well (90) in which the stator coils and the lower portion of the spindle hub are received.

31. A disc drive according to claim 30 characterized in that the stator coils are confined within the well and do not extend above downwardly extending walls of the well, the portion of the spindle hub supporting the at least one disc extending over the stator coils to be closely adjacent the lower casing of the disc drive housing and to define a confined region for the stator coils and the magnet means.

32. A disc drive according to claim 29 characterized in that bearing means (62) located between the fixed shaft and the spindle hub are located near upper and lower ends of the fixed shaft, with the magnet means being located nearly adjacent the lower bearing means.

33. A disc drive according to claim 29 characterized in that the portion of the spindle hub supporting the at least one disc includes screw holes for receiving screws (75) holding a disc fastener (25) atop the at least one disc, and in that a shield (76) is provided at the bottom of the screw holes facing the stator coils and the magnet means to prevent the entry of particles into the spindle motor assembly through the screw holes.

* * * * *